May 5, 1931.                F. M. SCHULER                1,803,656
                     AUTOMATIC FEEDER FOR CANDY MACHINES
                            Filed Oct. 29, 1928
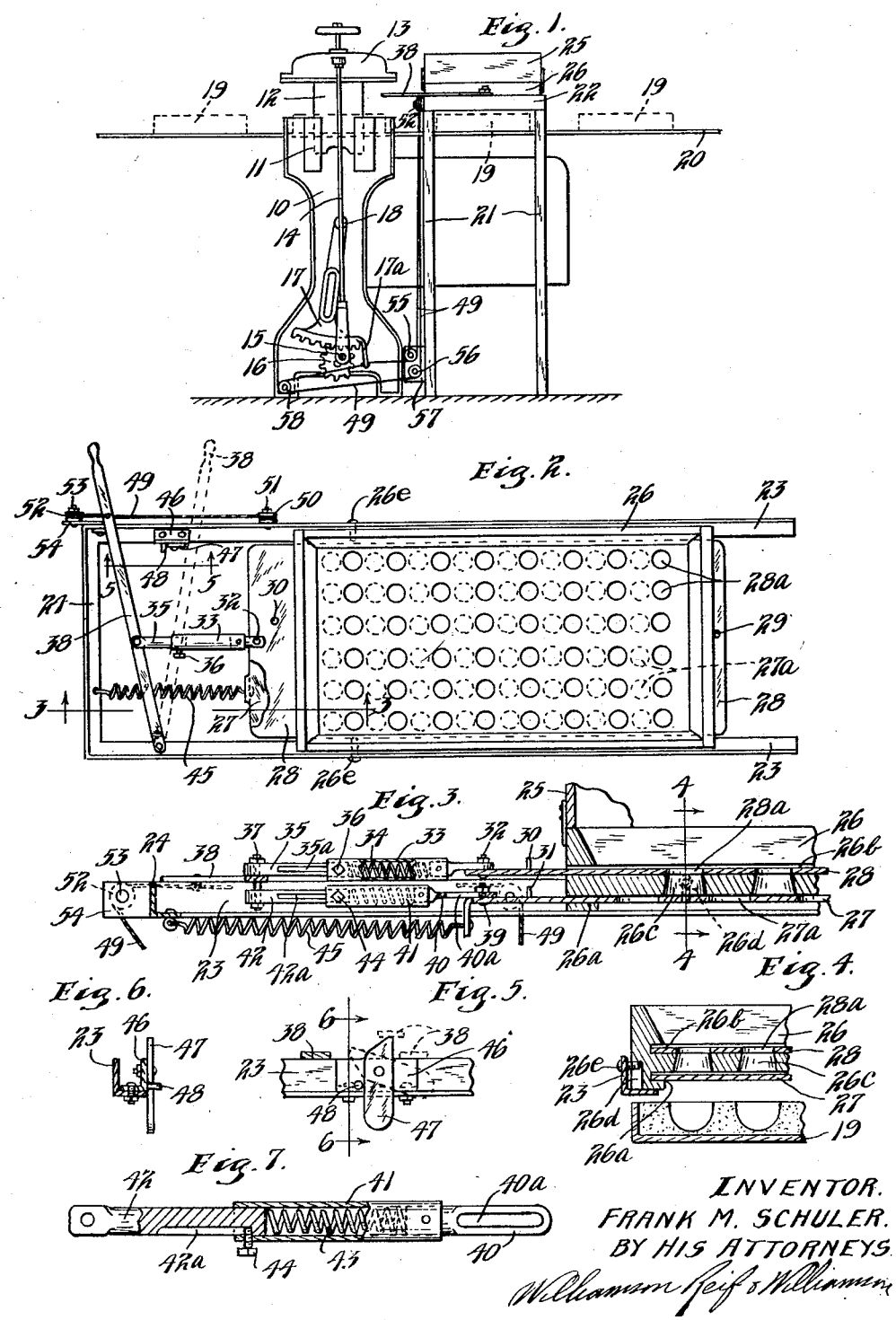
INVENTOR.
FRANK M. SCHULER.
BY HIS ATTORNEYS Patented May 5, 1931

1,803,656

UNITED STATES PATENT OFFICE

FRANK M. SCHULER, OF WINONA, MINNESOTA

AUTOMATIC FEEDER FOR CANDY MACHINES

Application filed October 29, 1928. Serial No. 315,726.

This invention relates to a candy making machine and particularly to a device cooperating with such a machine to feed cherries, nuts and similar articles to the candy pieces. In one modern type of candy making machine, the pieces of candy, whether small or of larger size in the form of bars, are formed in depressions made in starch, the materials being deposited in the starch moulds as the same progress on the machine. It has been the common practice, with such machines, where pieces of candy have contained nuts or cherries, to have operators stand at the sides of the machine and drop the cherries or nuts into the candy pieces or bars at the proper time. This is rather slow and at the same time an expensive method and when competition is keen, as at present in the candy bar business, it is desirable to have a machine which will automatically drop the nuts and cherries. It is also desirable, from the viewpoint of speed and economy, to have a device which will simultaneously drop the cherries and nuts into all of the moulds of the tray.

It is an object of this invention, therefore, to provide a device which will automatically feed or distribute the cherries or nuts into a plurality of rows of the starch moulds.

It is another object of the invention to provide a hopper having a plurality of rows of apertures in the bottom thereof adapted to align with the moulds in the starch tray, together with mechanism for automatically discharging nuts or cherries through all of said apertures into the moulds in the starch tray.

It is more specifically an object of the invention to provide a feeding or distributing device comprising a hopper adapted to contain the nuts, cherries or similar articles and having a plurality of rows of apertures in the bottom thereof, together with means above and below said hopper bottom for alternately opening and closing said apertures and actuating means for automatically operating said means.

It is still another object of the invention to provide a device for feeding or distributing nuts, cherries or similar articles to the starch moulds of a tray, comprising a device adapted to receive the nuts or cherries and having a plurality of rows of apertures through which the same will be automatically discharged, together with means for jarring said device to assist in the discharge of said nuts or cherries.

These and other objects and advantages of the invention will be fully set forth in the following description made in connection with the accompanying drawings, in which like reference characters refer to similar parts throughout the several views, and in which:—

Fig. 1 is a view in side elevation showing part of the candy making machine with the device of this invention applied thereto;

Fig. 2 is a plan view of the feeding device proper;

Fig. 3 is a vertical section taken on line 3—3 of Fig. 2 and shown on an enlarged scale;

Fig. 4 is a vertical section taken on line 4—4 of Fig. 3;

Fig. 5 is a vertical section taken on line 5—5 of Fig. 2;

Fig. 6 is a vertical section taken on line 6—6 of Fig. 5.

All of said sections are taken as indicated by the arrows.

Fig. 7 is a view in side elevation of one of the connecting members used, part thereof being broken away and other parts shown in vertical section.

Referring to the drawings. In Fig. 1 a portion of a candy making machine is shown comprising a side frame member 10 having guiding members 11 in which are vertically reciprocable the guiding and supporting members 12 of the printer member 13. The member 13 is reciprocated by rods 14 at either side thereof connected to said printer and connected at their lower ends to a part 15 eccentrically carried by a gear 16. The gear 16 is actuated by a segment 17 mounted on a shaft 18 driven by any suitable connection to the driving means for the machine. The printer 13 carries on its underface patterns or dies adapted to form depressions in a layer of starch contained in trays 19 which are movable longitudinally through the machine on an endless carrier 20. The parts thus far described are well known and comprise the usual parts of a standard machine of such type.

In accordance with the present invention, a frame 21 is provided having a feeding means 22 at the top thereof. This means 22 extends transversely across the machine so as to extend entirely over one of the trays 19. The said device comprises a rectangular frame extending transversely over the machine and while this frame can be variously constructed, in the embodiment of the invention illustrated, it is shown as formed by the parallel angle bars 23 connected by the end angle bars 24. Angle bars 24 have one of their flanges extending horizontally inwardly, the other flanges extending vertically so that a supporting means is formed by said bars. A receptacle or hopper 25 is provided having a bottom portion 26 which extends between and is supported upon the horizontal flanges of bars 23. Said hopper has narrow supporting portions at its ends traversed by slots 26a through which a plate 27 reciprocates, said plate having a plurality of rows of apertures 27a therethrough. Member 26 has an upper slot 26b through which reciprocates a plate 28 having therethrough a plurality of rows of apertures 28a. The portion of member 26 above plate 28 has upwardly sloping sides and the portion between plates 27 and 28 which is in the form of a board or plate has a plurality of rows of downwardly flaring holes 26c therethrough which holes are spaced and arranged the same as the holes 27a and 28a. Member 26 has a narrow vertical slot 26d in each side into which extends screws 26e threaded into the vertical flanges of bars 23. The plates 27 and 28 extend beyond the ends of member 26 and have upstanding pins 29 at their rear ends adapted to engage the outer sides of member 26 and form stops limiting the movement of said plates. Said plates also have at their front ends pins 30 and 31 adapted to engage the front end of member 26 and form stops limiting the inward movement of said plates. The plate 28 is pivotally connected by the headed and nutted bolt 32 to a hollow sleeve 33 in which is disposed a coiled compression spring 34. A plunger 35 reciprocates in casing 33, the same having a slot 35a at one side thereof into which extends the end of the screw 36 threaded into the side of casing 33. The plunger 35 is pivotally connected by a nutted stud or screw 37 to a lever 38 pivoted at one end to one of the bars 23 and extending over and some distance beyond the opposite bar 23. Plate 27 has secured therein a bolt 39 extending through a slot 40a in a member 40 secured to a hollow casing 41, member 40 being slidable relatively to the bolt 39 and plate 27. A plunger 42 is slidable into casing 41 and engages a compression coiled spring 43 disposed in said casing. The plunger 42 has a slot 42a in the side thereof into which extends the end of a screw 44 threaded into casing 41. Plunger 42 is pivotally connected at its outer end to stud 37. The spring 45 is connected at one end to bar 24 and its other end to a down-turned lug on plate 27. The bar 23 over which lever 38 projects has an angle bracket 46 secured thereto having an upstanding flange at the inner side of which is pivoted a swinging pawl 47. A pin 48 projects at one side of pawl 47 forming a stop limiting the movement of said pawl when in the vertical position, said pawl having an upwardly and rearwardly inclined top surface.

The lever 38 has secured thereto at the outer side of the bar 23 over which it extends a flexible member or cable 49 which runs over a sheave 50 pivotally mounted on a stud 51 secured in the side of bar 23 and over a sheave 52 mounted on a stud 53 secured in a plate 54 bolted to and extending beyond the end of bar 23. The cable 49 extends downward from sheaves 50 and 52 and the strands thereof run respectively over sheaves 55 and 56 mounted on a bracket 57 secured to frame 21 and said cable then extends over a sheave 58 mounted on the frame 10. An arm 17a extends downward from one end of segment 17 and the cable 49 is secured to the end of this arm.

In operation, cherries or nuts, as desired, are placed in the hopper 25 in which an agitator will be located. Said articles feed down onto the plate 28 and one of the same will pass through each aperture 28a and into the holes 26c where they will rest on the plate 27. When the machine is operating segment 17 is oscillating and thus arm 17a will cause cable 49 to travel short distances in reverse directions over its sheaves. The cable being secured to lever 38, this lever will be oscillated about its end to the positions shown in full and dotted lines in Fig. 2. Assuming that the lever is in its full line position and the articles to be fed have passed into the holes 26c, said lever 38 will next be swung toward its dotted line position. When said lever so moves, it moves plunger 35 which, acting through spring 34, will push plate 28 inwardly until pin 30 engages the end of member 26 when further movement of said plate will cease and any further movement of plunger 35 will merely compress spring 34. As lever 38 moves, plunger 42 will also be moved and will move member 40. This will not immediately move plate 27, but member 40 will move relatively to bolt 39 and plate 27 until the end of slot 40a engages bolt 39, after which plate 27 will also be moved inwardly until pin 31 engages member 26 after which any further movement of plunger 42 will compress spring 43. When plate 28 is moved inwardly the holes 28a are moved out of alignment with holes 26c so that the latter are closed at their upper ends. When plate 27 is moved inwardly the apertures 27a are moved into alignment with holes 26c so that the cherries, nuts or other articles in said holes can drop through apertures 27a. When lever 38 moves toward the dotted line position shown in Fig. 2 it rides up over pawl 47 as shown in dotted lines in Fig. 5 and drops suddenly down onto the bar 23. When the lever 38 rides up over pawl 47 it raises member 26 and the plates 27 and 28 somewhat and when it drops again onto bar 23, member 26 and plates 27 and 28 are given quite a jar. Any articles in the holes 26c thus drop out and at this time the holes in the tray 19 are aligned with holes 26c so that said articles drop in the depressions in the starch in tray 19. All the articles in member 26 are thus fed into the depressions in the tray 19 and it will be seen that a plurality of rows of such articles are simultaneously fed so that all of the moulds or depressions in the tray are simultaneously supplied with the desired articles. When lever 38 is moved back to its full line position by the cable 49, spring 45 moves plate 27 outward as quickly as possible until pin 29 engages the end of member 26. Plate 28 is also moved outwardly through its connection to lever 38. The plates are thus brought to the position shown in Fig. 3 with the holes 26c closed at their bottoms, but open at their tops. As lever 38 moves outwardly it engages pawl 47, but the pawl swings as shown in dotted line in Fig. 5 so that the lever is not raised in passing thereover. When plates 27 and 28 reach the position shown in Fig. 3, more articles are immediately distributed into the holes 26c so that the device is ready for the next operation. The tray 19 thus moves under the printer 13 and has the depressions printed therein. The tray then moves under the feeding device, while another tray moves under the printer. In the next actuation of the printer the feeding device is operated to feed cherries or nuts into all of the depressions in the tray. The feeding of the cherries or nuts is thus quickly and economically accomplished and no hand work is necessary in placing the same. The feeder can of course be placed in the desired position on the machine to feed nuts to the trays either before or after any other material has been discharged into the trays.

From the above description it is seen that applicant has provided a very simple and efficient feeding device for quickly and accurately dropping or distributing the desired articles to the trays. The work is efficiently done and at small expense and the necessity for hand labor is eliminated. The device is simple in construction, comprising comparatively few parts and can be quickly and easily applied to the standard candy making machine. The same has been amply demonstrated in actual practice and found to be very successful and efficient.

It will, of course, be understood that various changes may be made in the form, details, proportions and arrangement of the apparatus, without departing from the scope of applicant's invention, which, generally stated, consists in a device capable of carrying out the objects above set forth, in the novel parts and combinations of parts disclosed and defined in the appended claims.

What is claimed is:

1. A device for feeding cherries or other articles to the moulds in a candy making machine having in combination, a plate having a plurality of apertures therethrough, an upper movable plate adapted to be moved over said first mentioned plate for opening and closing the upper ends of said apertures, a lower movable plate below said first mentioned plate for closing and opening the lower ends of said apertures, means for feeding cherries and other articles to a point above said upper movable plate, an actuating member for both of said movable plates, means connecting said upper movable plate with said actuating member to close the upper ends of said apertures during movement of said actuating member in one direction, and means connecting said lower movable plate with said actuating member to open the lower ends of said apertures during movement of said actuating member in the same direction but subsequent to the closing of the upper ends of said apertures, whereby articles may be discharged through said apertures by movement of said actuating member in but a single direction.

2. The structure defined in claim 1, and means for jolting said first mentioned plate as said lower movable plate is moved to open the lower ends of said apertures.

3. The structure defined in claim 1, and means for moving said lower movable plate to close the lower ends of said apertures prior to the time that said upper movable plate is moved by said actuating member to open the upper ends of said apertures during reverse movement of said actuating member.

4. An article feeding device for a candy making machine adapted to drop articles in moulds having in combination, a hopper having a bottom with rows of holes therethrough, a plate movable above the bottom of said hopper and having a plurality of rows of apertures therethrough arranged to align with said holes, a second plate below said hopper having rows of apertures therethrough arranged to align with said holes, an actuating member, a connection between said first mentioned plate and actuating member, a connection between said actuating member and second plate comprising a lost motion mechanism whereby upon movement of said actuating member in one direction said first mentioned plate will close said holes at the top and said second mentioned plate will subsequently open said holes at the bottom.

5. An article feeding device for a candy making machine adapted to discharge cherries or other articles into moulds, having in combination, a hopper for containing a multiplicity of said cherries or other articles, said hopper having a bottom with a plurality of rows of holes therein adapted to receive said cherries or articles, plates movable above and below said bottom having rows of apertures therethrough adapted to align with the said holes, stops on said plates limiting the movement thereof with said apertures respectively in or out of alignment with said holes, a reciprocating actuating member, a yielding connection between said member and said plate above the bottom of said hopper, an arm and lost motion connection between said actuating member and the plate below the bottom of said hopper and a retracting spring connected to said last mentioned plate.

6. An automatic feeding device for a candy making machine having in combination a hopper adapted to contain a multiplicity of cherries or other articles and having a plurality of rows of openings in its bottom, members with rows of openings therethrough above and below said bottom, means for moving said members to permit articles to drop into said openings and to pass therefrom and means for raising and dropping said hopper and members to jar the same and cause the discharge of said articles.

7. An article feeding device for a candy making machine, which machine includes a moving element, having in combination, a hopper adapted to contain a multiplicity of cherries or other articles and having a plurality of rows of openings in its bottom, a member above said bottom having rows of apertures therethrough adapted to be moved into and out of alignment with the apertures in said bottom, a second member below said bottom having rows of apertures therethrough adapted to be moved into and out of alignment with the apertures in said bottom, an operating member, means connecting said first mentioned member and said second member to said operating member and means connecting said operating member to said moving element whereby in the operation of said machine said operating member will be moved and rows of cherries will be automatically discharged from said hopper through the bottom thereof.

In testimony whereof I affix my signature.

FRANK M. SCHULER.